(12) United States Patent
Oka et al.

(10) Patent No.: US 7,751,014 B2
(45) Date of Patent: Jul. 6, 2010

(54) LIQUID-CRYSTAL DISPLAY DEVICE

(75) Inventors: Shinichiro Oka, Hitachi (JP); Osamu Itou, Hitachi (JP); Shoichi Hirota, Hitachi (JP)

(73) Assignee: Hitachi Displays, Ltd., Mobara-shi (JP)

( * ) Notice: Subject to any disclaimer, the term of this patent is extended or adjusted under 35 U.S.C. 154(b) by 148 days.

(21) Appl. No.: 12/182,193

(22) Filed: Jul. 30, 2008

(65) Prior Publication Data
US 2009/0033848 A1 Feb. 5, 2009

(30) Foreign Application Priority Data
Aug. 3, 2007 (JP) ............................. 2007-203415

(51) Int. Cl.
G02F 1/343 (2006.01)
G02F 1/335 (2006.01)
(52) U.S. Cl. ........................................ 349/141; 349/114
(58) Field of Classification Search .................. 349/114, 349/141
See application file for complete search history.

(56) References Cited

U.S. PATENT DOCUMENTS 7,206,051 B2 * 4/2007 Lee et al. .................... 349/141
2009/0296030 A1* 12/2009 Ikebe ......................... 349/110

OTHER PUBLICATIONS

Zhibing Ge et al., High Transmittance In-Plane Switching Liquid Crystal Displays, Journal of Displays Technology, Jun. 2006, vol. 2, No. 2, pp. 114-120.

* cited by examiner

Primary Examiner—Akm E Ullah
(74) Attorney, Agent, or Firm—Antonelli, Terry, Stout & Kraus, LLP.

(57) ABSTRACT

This invention includes a first substrate, a second substrate, a liquid-crystal layer sandwiched between the first substrate and the second substrate, and a plurality of pixels each surrounded by scan lines and signal lines arranged in a matrix format on the second substrate; with a first pixel electrode, a second pixel electrode, a first common electrode, and a second common electrode being arranged in the pixel region of the second substrate above which the liquid-crystal layer is disposed, the first pixel electrode and the first common electrode being arranged on a first layer, the second pixel electrode and the second common electrode being arranged on a second layer, the first pixel electrode and the second common electrode being overlapped upon each other in the pixel region, and the second pixel electrode and the first common electrode being overlapped upon each other in the pixel region.

15 Claims, 16 Drawing Sheets

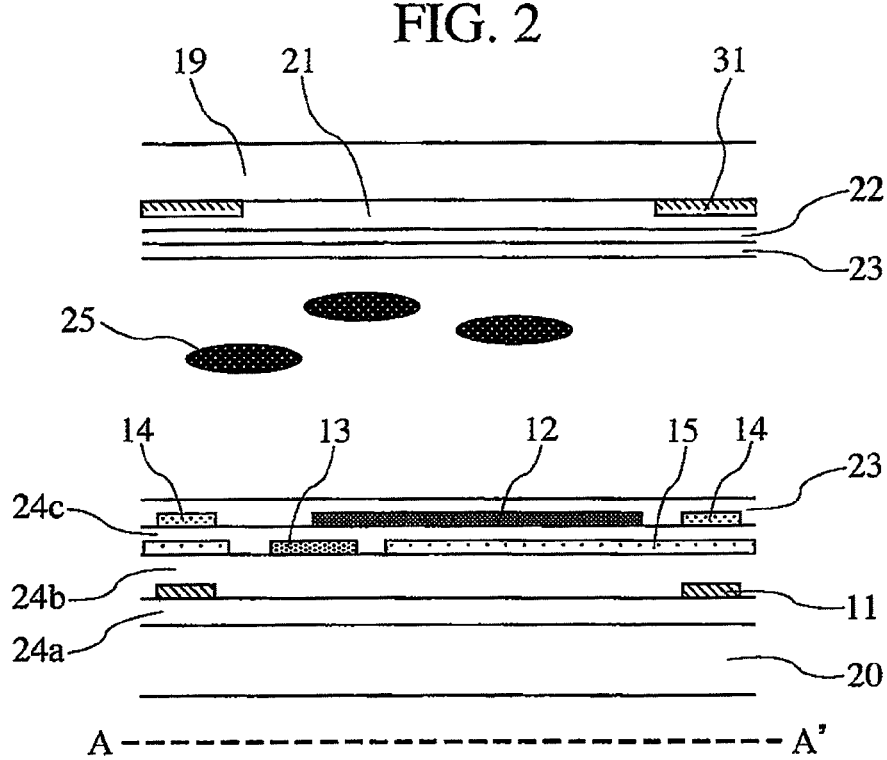
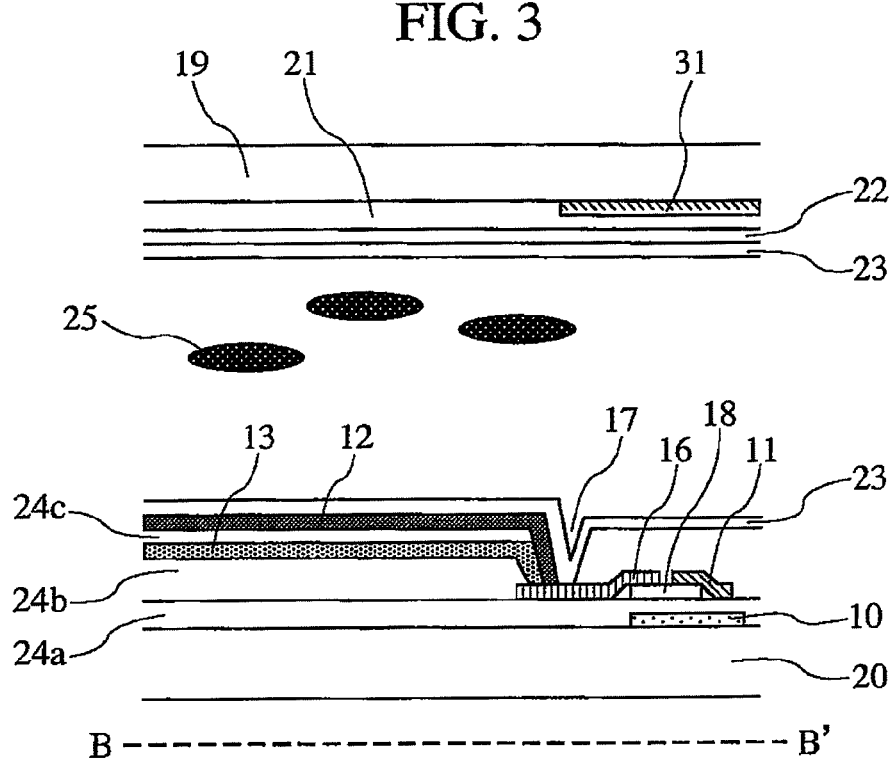

FIG. 6A
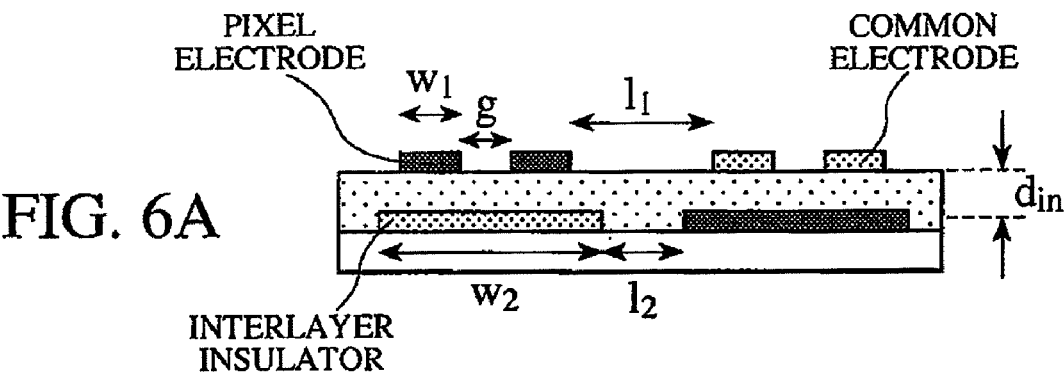
FIG. 6B
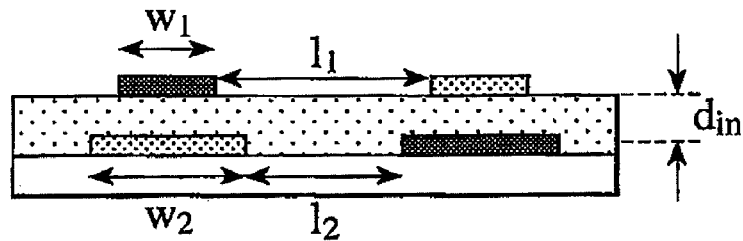
FIG. 6C
| | PRESENT EMBODIMENT | HT-IPS |
|---|---|---|
| Δε | 8 | 8 |
| Δn | 0.095 | 0.095 |
| d | 4 μm | 4 μm |
| Δnd | 380nm | 380nm |
| w1 | 2 μm | 2 μm |
| w2 | 3 μm | 9 μm |
| l1 | 6 μm | 6 μm |
| l2 | 5 μm | 5 μm |
| g | — | 4 μm |
| pre-twist | 80deg. | 80deg. |
| pre-tilt | 2deg. | 2deg. |
| din | 300nm | 300nm |

Δnd DEPENDENCE

Δε DEPENDENCE

LIQUID-CRYSTAL DISPLAY DEVICE

BACKGROUND OF THE INVENTION

1. Field of the Invention

The present invention relates to liquid-crystal display devices, and more particularly, to the electrodes structure of a liquid-crystal display device of an IPS mode.

2. Description of the Related Art

Liquid-crystal display devices, unlike self-luminous displays represented by cathode-ray tube (CRT) types of displays, plasma display panel (PDP) types of displays, or the like, are non-luminous types of displays that display images by controlling the amount of light transmitted. Liquid-crystal displays (LCDs) feature thin, lightweight design and low power consumption.

Currently, typical liquid-crystal display schemes that allow wide viewing angles to be achieved include IPS (In-Plane Switching), VA (Vertical Alignment), etc. The IPS mode is a liquid-crystal driving scheme that utilizes the rotation of liquid-crystal molecules in an in-plane direction to rotate effective retardation in a plane and thus to control transmittance. In the LCDs of the IPS mode, therefore, changes in the retardation of liquid crystals are small irrespective of viewing angles. For this reason, the LCDs of the IPS mode are known to make wide viewing angles achievable. Various methods are proposed for applying an in-plane electric field, and the method most commonly used to implement this is by employing electrodes in interdigital shape. For instance, a method in which pixel electrodes and common electrodes are both formed into the interdigital shape, a method in which either pixel electrodes or common electrodes are formed into the interdigital shape and non-interdigital (i.e., solid or planar) common electrodes or pixel electrodes are disposed via an insulating layer, or other methods are used as the practical in-plane field application methods that employ interdigital electrodes. Other various electrode structures have been proposed, also.

SUMMARY OF THE INVENTION

In the IPS mode, an in-plane electric field is applied to rotate liquid-crystal molecules in a plane. To rotate liquid-crystal molecules uniformly in an in-plane direction in the entire pixel region of a liquid-crystal display element, it is necessary to apply an electric field completely parallel to the in-plane direction. However, this is difficult during actual operation. Conventionally, therefore, a quasi in-plane electric field has been applied by arranging electrodes, called the interdigital electrodes, on one substrate. For higher transmittance, the liquid-crystal molecules need to be rotated more uniformly in the in-plane direction.

Such an electrode structure as shown in the following Non-Patent Document 1 has been proposed as a solution to the above problem. In this electrode structure, when the number of lower electrodes is one, that of upper electrodes formed via an insulating layer is two, and the potential of these electrodes alternates between common potential and signal potential for each period. However, this structure has the problem that the liquid-crystal molecules at the upper sections of the electrodes do not completely rotate in the in-plane direction.

Non-Patent Document 1: J. Dis. Tech. Vol. 2, No. 2, 2006, p. 114

An object of the present invention is to provide a liquid-crystal display device of the IPS mode, improved in transmittance.

The present invention comprises a first substrate, a second substrate, a liquid-crystal layer sandwiched between the first substrate and the second substrate, and a plurality of pixels each surrounded by scan lines and signal lines arranged in a matrix format on the second substrate; wherein a first pixel electrode, a second pixel electrode, a first common electrode, and a second common electrode are arranged in the pixel region of the second substrate above which the liquid-crystal layer is disposed; both the first pixel electrode and the first common electrode being arranged on a first layer, both the second pixel electrode and the second common electrode being arranged on a second layer, the first pixel electrode and the second common electrode being overlapped upon each other in the pixel region, and the second pixel electrode and the first common electrode being overlapped upon each other in the pixel region.

As described above, according to the present invention, it is possible to provide a liquid-crystal display device high in transmittance and minimized in color shifting.

BRIEF DESCRIPTION OF THE DRAWINGS

Other objects and advantages of the invention will become apparent from the following description of embodiments with reference to the accompanying drawings in which:

FIG. 2 is a cross-sectional schematic view of section A-A' shown in FIG. 1;

FIG. 3 is a cross-sectional schematic view of section B-B' shown in FIG. 1;

FIG. 6 is a model of simulation for verifying effectiveness of the first embodiment;

DETAILED DESCRIPTION OF THE PREFERRED EMBODIMENTS

Hereunder, embodiments of the present invention will be described using the accompanying drawings.

First Embodiment

A first embodiment of the present invention is described below using FIGS. 1 to 11. The present embodiment is characterized in that in a liquid-crystal display device of an IPS mode that uses interdigital electrodes, the interdigital electrodes are arranged in twin-layer form via an interlayer insulator, in that the two electrode layers have either a common potential or a source potential, in that the electrode layer having either potential and the other electrode layer having the other potential are arranged to overlap each other vertically via the interlayer insulator, in that of the two overlapping electrodes, the electrode disposed at the upper position is narrower than the electrode disposed at the lower position, and in that the common potential and the source potential alternate vertically for each interdigital electrode.

Figure 5:
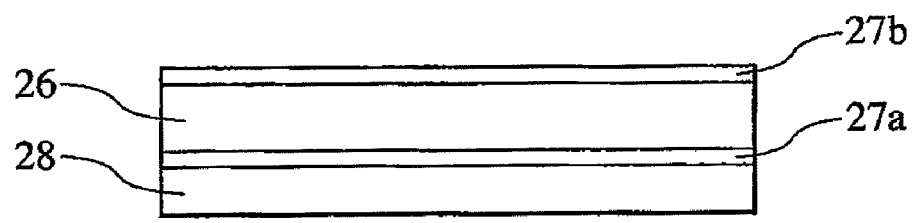
FIG. 5 is a cross-sectional schematic view of a liquid-crystal display device according to the present invention.

The present embodiment is first described using FIG. 5. FIG. 5 shows a cross-sectional schematic view of the liquid-crystal display device of the present invention. The liquid-crystal display device in FIG. 5 includes one pair of polarizing plates 27, a liquid-crystal cell 26, and a backlight unit 28. The polarizing plates 27 each include a polyvinyl alcohol (PVA) layer that was stretched by artificial injection of iodine and a passivation layer. The absorption axis of a first polarizing plate 27a and that of a second polarizing plate 27b are arranged almost perpendicularly to achieve a normally closed state. The backlight unit 28 includes a light source, an optical waveguide, a diffuser, and the like. The light source can be any object having the ability to illuminate the liquid-crystal cell 26 from its reverse side, and this illumination form does not limit the kind and structure of light source. For example, a cold-cathode fluorescent lamp (CCFL), a light-emitting diode (LED), or the like can be used as the light source.

Figure 1:
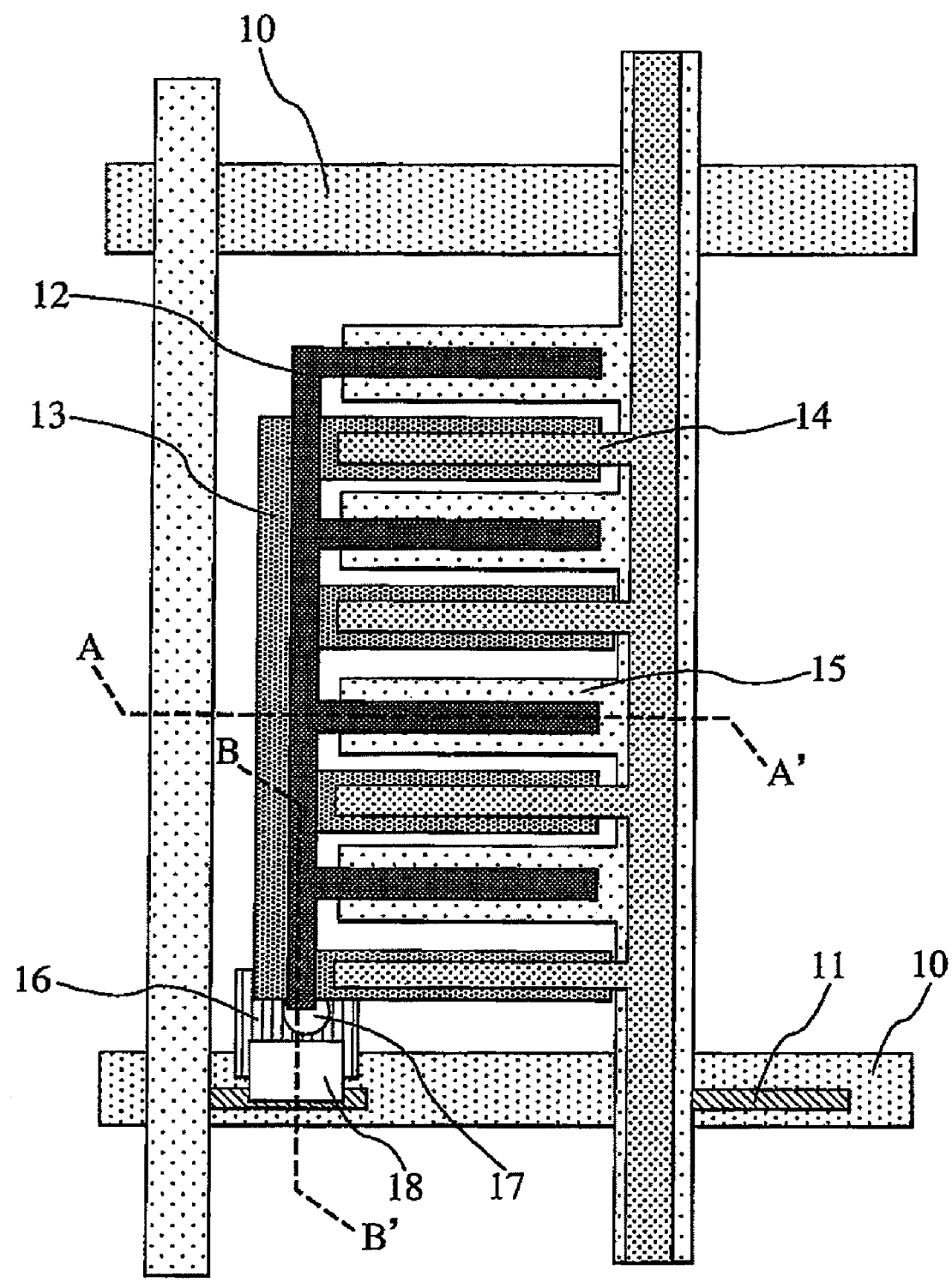
FIG. 1 is a schematic view of the plane structure of a liquid-crystal cell in a first embodiment.

FIG. 1 shows a schematic view of the plane structure of the liquid-crystal cell 26 shown in FIG. 5. FIGS. 2 and 3 show cross-sectional schematics of sections A-A' and B-B', respectively, shown in FIG. 1. The liquid-crystal cell 26 in FIG. 5 includes, as shown in FIGS. 2 and 3, a first substrate 19, a second substrate 20, and a liquid-crystal layer 25 sandwiched between the substrates.

The liquid-crystal layer 25 includes a liquid-crystal composition whose liquid-crystal molecules exhibit positive dielectric anisotropy, that is, whose liquid-crystal molecules have a dielectric constant smaller in a major-axis direction of the molecules than a value thereof in a minor-axis direction. The liquid-crystal layer 25 uses a liquid-crystal material that exhibits a nematic phase in a wide range including a room-temperature domain. This liquid-crystal material also has characteristics in that under driving conditions in which a thin-film transistor (TFT) is used, the material retains sufficient transmittance during a retention period and exhibits a resistivity high enough to cause no flickering. That is to say, the resistivity of the liquid-crystal layer 25 is desirably $10^{12}$ $\Omega cm^2$ or more, and more particularly, $10^{13}$ $\Omega cm^2$ or more. The phase difference of the liquid-crystal layer is desirably $\lambda/2$ or more, where $\lambda$ denotes wavelength of light.

The first substrate 19 has an alignment film 23 disposed in the layer closest to the liquid-crystal layer. Additionally, the first substrate 19 has a color filter 21 on its surface, and a leveling layer 22 is disposed on the liquid-crystal layer side of the color filter 21. A black matrix 31 is disposed at sections such as between pixels and/or above a TFT, as required.

The second substrate 20 also has an alignment film 23 disposed in the layer closest to the liquid-crystal layer. A first pixel electrode 12 and a first common electrode 14 are next arranged. A TFT is disposed to control voltages applied to each pixel. As shown in FIG. 1, a contact hole 17 is formed to establish an electrical connection between a source electrode 16 of the TFT and first and second pixel electrodes. Although the pixel electrode section is of a twin-layer structure, the contact with the source electrode 16 can be achieved by, for example, disposing this electrode as shown in FIG. 3. An insulating layer 24a, 24b, or 24c is disposed at such sections as between the first pixel electrode 12 and the second pixel electrode 13, between a scan line 10 and the source electrode 16, and between a signal line 11 and the second pixel electrode 13.

The first substrate 19 and the second substrate 20 are transparent to let light pass therethrough, and these substrates can use, for example, glass or a polymer film. More particularly, the polymer film is desirably a plastic or polyethersulfone (PES). Since plastics and PES permit air to flow therethrough, however, a gas barrier needs to be formed on the surface of the substrate. The gas barrier is desirably formed using a silicon nitride film.

The alignment film 23 has a function that aligns the liquid-crystal molecules on the surface of the substrate horizontally. The alignment film 23 is desirably a polyimide-based organic film.

Figure 4:
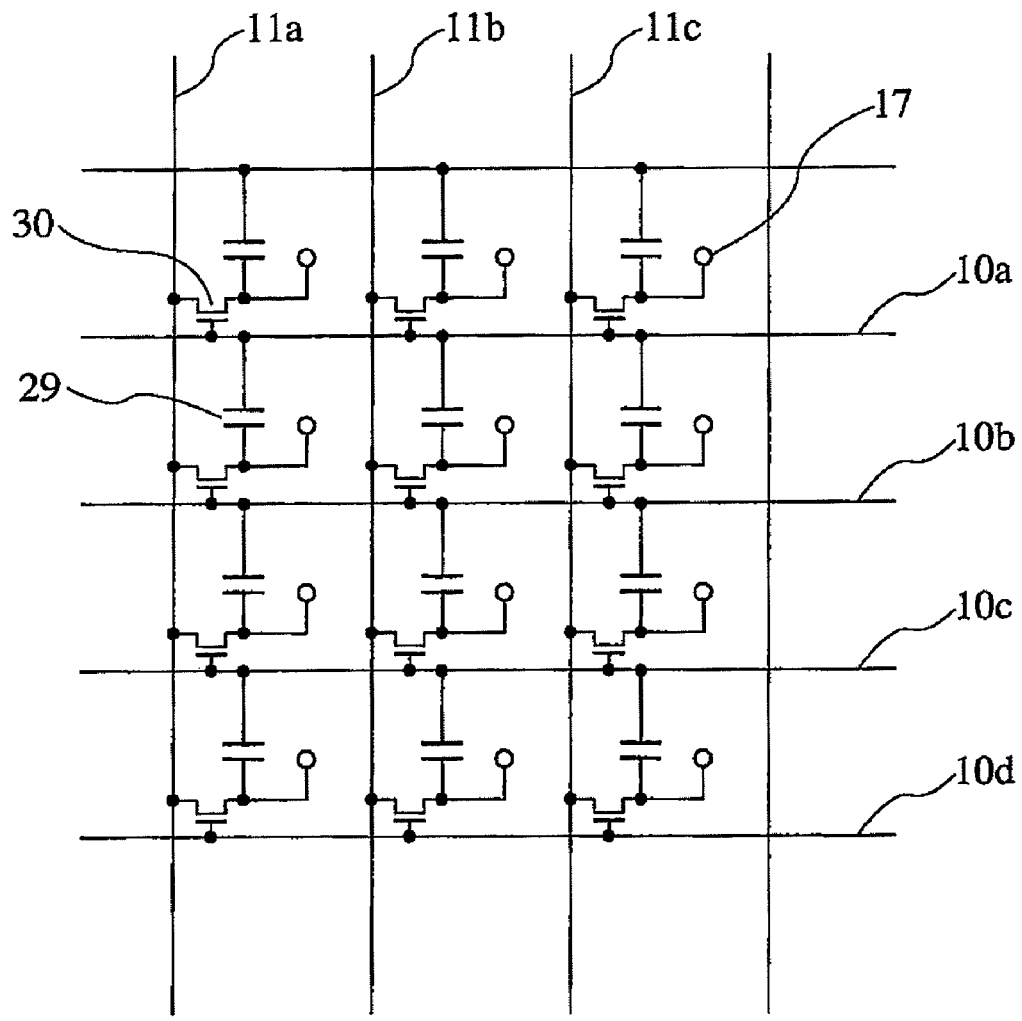
FIG. 4 is an equivalent circuit diagram of pixels arranged in matrix form to constitute pixel display regions.

Next, the pixel electrodes and the TFTs are described below using FIG. 4. FIG. 4 is an equivalent circuit diagram of the pixels arranged in matrix form to constitute pixel display regions. The pixel regions include the signal lines 11 and scan lines 10. Each region enclosed by two signal lines 11 and two scan lines 10 forms a pixel. The signal line 11 and the scan line 10 are arranged almost orthogonally, and at least one TFT 30 is present at an intersection between the lines. The TFT 30 is connected to a contact hole 17. In an ordinary liquid-crystal display device, one pixel electrode is connected to one contact hole. In the present embodiment, however, two different pixel electrodes, 12 and 13, are connected to one contact hole 17 as shown in FIG. 3. A storage capacitor 29 may also be disposed to prevent leakage of an image signal retained in a pixel.

While active-matrix drive that employs a TFT 30 in one pixel is taken by way of example in the present embodiment, use of passive-matrix drive also yields a similar advantageous effect in the embodiment. The TFT 30 is inversely staggered, and as shown in FIG. 3, has a semiconductor layer 18 at its channel section.

A voltage signal for controlling the liquid-crystal layer is applied to the signal line 11, and a signal for controlling the TFT 30 is applied to the scan line 10. As shown in FIG. 1, the source electrode 16 is connected to the pixel electrodes 12 and 13 via the contact hole 17. The signal line 11, the scan line 10, and the source electrode 16 are each desirably formed of a low-resistivity electroconductive material, which is desirably chrome, tantalum-molybdenum, tantalum, aluminum, copper, or the like.

The first pixel electrode 12 and second pixel electrode 13 in FIGS. 1 to 3 are arranged to apply an electric field to the liquid-crystal layer 25. The pixel electrodes 12 and 13 are each made of a transparent electroconductive material, which is, for example, indium-tin oxide (ITO) or zinc oxide (ZnO).

The color filter 21 has a red region/green region/blue region arrayed on a pixel-by-pixel basis to transmit light of either red, green, or blue. For example, a stripe array, a delta array, or the like is usable as such a layout form.

The leveling layer 22 is provided to remove any surface irregularities occurring during fabrication of the color filter. The leveling layer 22 desirably uses an acrylic resin as its material.

The black matrix 31 is disposed to shut off the light and others leaking from adjacent pixels. The black matrix 31 can use an opaque material such as a metal or resin, and this material is desirably chrome, tantalum-molybdenum, tantalum, aluminum, copper, or the like.

The first common electrode 14 and the second common electrode 15 are made of a transparent electroconductive material, which is, for example, indium-tin oxide (ITO) or zinc oxide (ZnO). Those sections of the common electrodes 14 and 15 which are positioned above the signal line 11 and the scan line 10, however, can use a low-resistivity electroconductive material, for example, chrome, tantalum-molybdenum, tantalum, aluminum, copper, or the like, to reduce interconnection resistance. The low-resistivity material can also be stacked on the transparent conductive material.

If a common line is disposed for each pixel, a contact hole for the common line will be needed in each pixel. This will reduce aperture ratios of pixels. In order to avoid this problem, therefore, vertically adjacent pixels are connected to each other as shown in FIG. 1. Use of this connection form eliminates the necessity for arranging a contact hole in each pixel, thereby improving the aperture ratios. Regions parallel to and on the signal line 11 are used as line regions in the present embodiment. Thus, any impacts of field leakage from the signal line 11 can be removed and the aperture ratios improved.

Simulation-based study results on advantageous effects of the present embodiment are next described. The simulation used a commercially available simulator (LCD-Master: manufactured by SHINTECH, Inc.). Simulation parameters and results are shown in FIGS. 6 and 7, wherein comparisons with the HT-IPS mode shown in Non-Patent Document 1 are shown. The data shown in Non-Patent Document 1 was used as simulation parameters of the HT-IPS mode. Reference symbol $\Delta\in$ in FIG. 6C denotes the dielectric anisotropy of the liquid crystal, $\Delta$n denotes birefringence thereof, and "d" denotes thickness of the liquid-crystal layer. Also, $\Delta$nd denotes retardation of the liquid-crystal layer, and w1, w2, 11, 12, and "g" denote horizontal dimensions shown in FIGS. 6A and 6B. In addition, "pre-twist" denotes an angle at which the liquid crystal near the substrate interface rotates in an azimuthal angle direction (at 0 degrees, the liquid crystal is parallel to the signal line), "pre-tilt" denotes an angle at which the liquid crystal near the substrate interface rotates in a polar angle direction (at 0 degrees, the liquid crystal is parallel to the substrates), and "din" denotes film thickness of the interlayer insulators. Relative permittivity of the interlayer insulators is 6.5, which assumes that the insulators are SiN films.

Figure 7A:
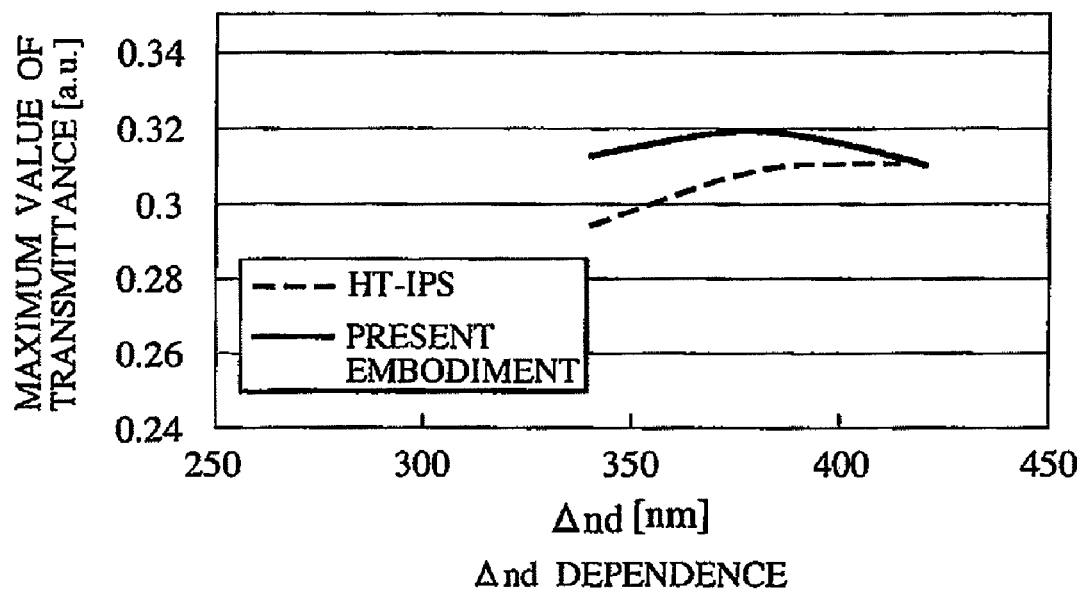
FIG. 7 is a graph that shows simulation results of the model shown in FIG. 6.
Figure 7B:
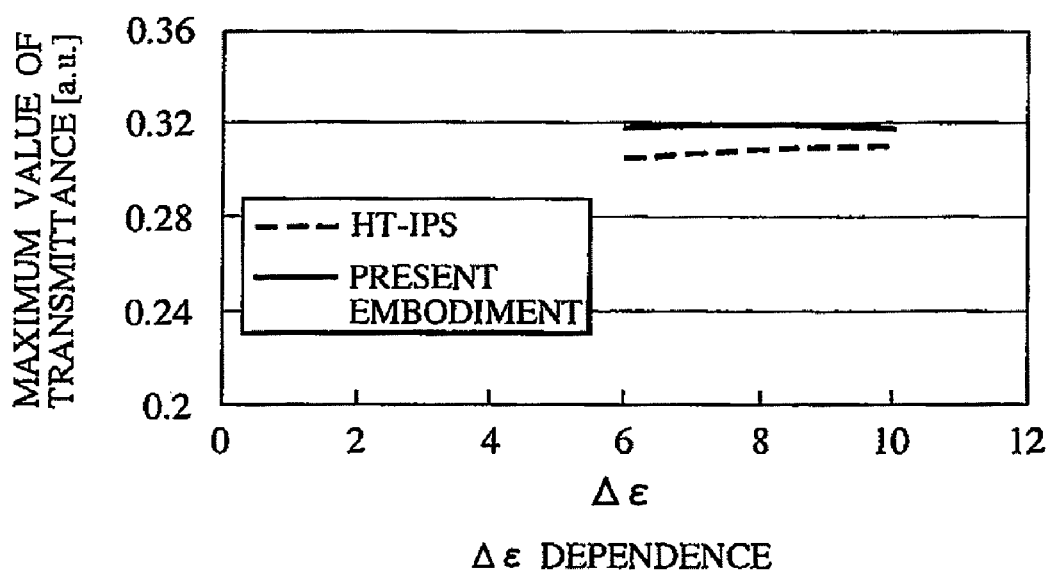

FIG. 7 shows simulation results on $\Delta$nd dependence and $\Delta\in$ dependence of a maximum transmittance value. FIG. 7A shows calculations obtained for various $\Delta$nd values from 340 to 420 nm. FIG. 7B shows calculations obtained for various $\Delta\in$ values from 6 to 10. A voltage exhibiting the maximum transmittance was applied. The simulation results indicate that in the calculated data range, the present embodiment is higher than HT-IPS in transmittance. The transmittance can be further enhanced by changing "din," the film thickness of the interlayer insulators.

The present embodiment is of a twin-layer structure with interdigital electrodes arranged via an interlayer insulator. If one common electrode is disposed in the lower layer of this structure, one pixel electrode is disposed in the upper layer thereof. Conversely, if one pixel electrode is disposed in the lower layer of the structure, one common electrode is disposed in the upper layer thereof. These relationships in position between the two kinds of electrodes alternate for each electrode pair. At this time, if width of the electrode disposed on the liquid-crystal layer side is expressed as w1, and width of the electrode disposed on the second-substrate-20 side, as w2, then width of the electrode disposed in the lower layer of the two-layer structure satisfies a relationship of w2/2<w1≦w2. The simulation was conducted assuming that w2 is 3 µm and that w1 is 2 µm.

In the present embodiment, if width of the first pixel electrode 12 is w1 and that of the second common electrode 15 is w2, a relationship of w2/2<w1≦w2 is established in the pixels; if width of the first common electrode 14 is w1' and that of the second pixel electrode 13 is w2', a relationship of w2'/2<w1'≦w2' is established in the pixels.

In the present embodiment, the direction of the interdigital electrodes is essentially parallel to the scan line 10, and the first common electrode 14 and the second common electrode 15 are connected to adjacent pixels on the signal line 11. The adjacent pixels here are those parallel to the direction of the signal line 11.

Another configuration for obtaining the advantageous effects of the present embodiment is described below using FIGS. 8 to 11. To obtain the advantageous effects of the present embodiment, the interdigital electrodes can be arranged in a direction essentially parallel to the signal line 11. The first common electrode 14 and the second common electrode 15 are connected to vertically adjacent pixels on the scan line 10 and may be connected on both the scan line 10 and the signal line 11. The adjacent pixels here can be those parallel to the direction of the scan line 10.

Figure 8:
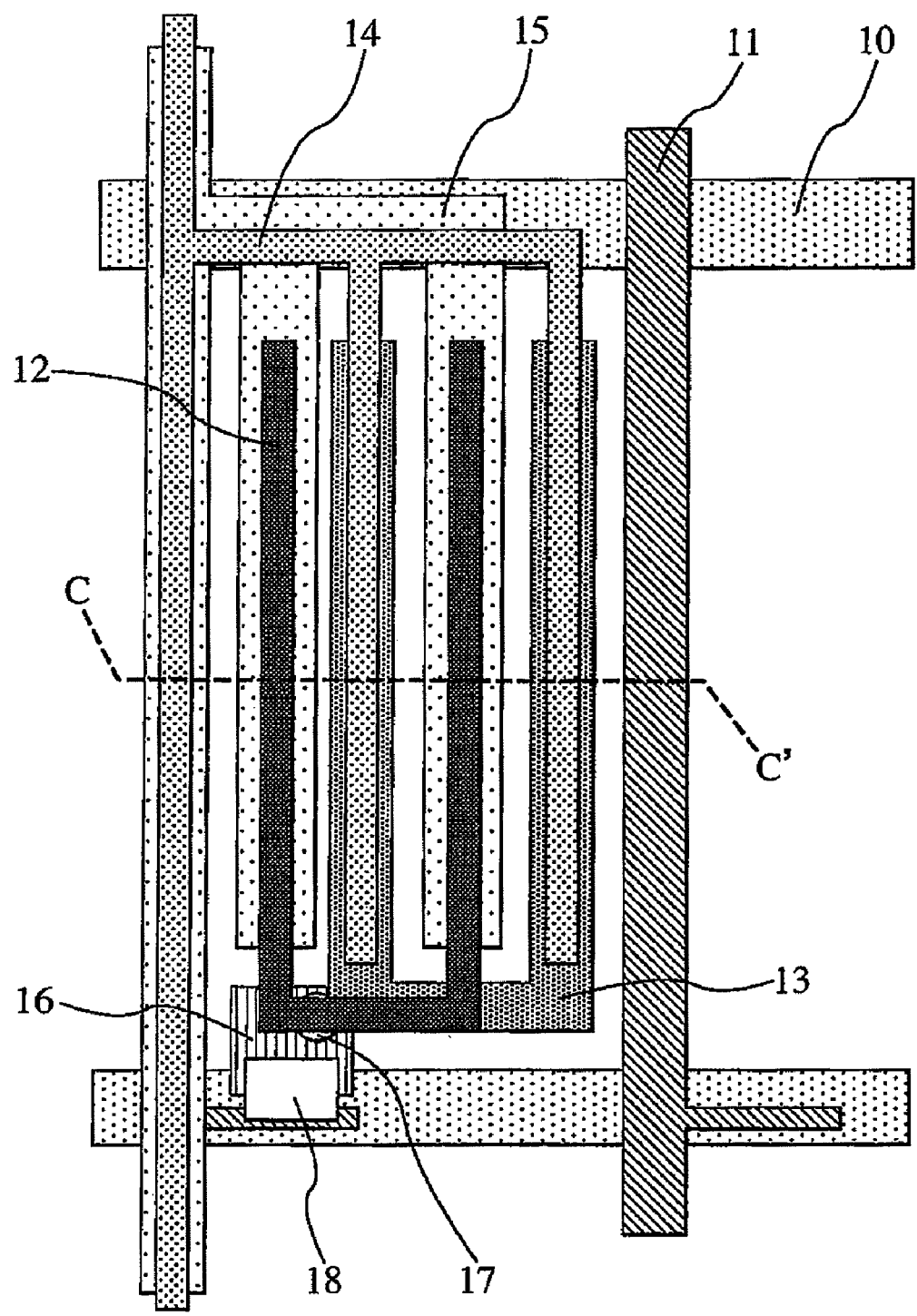
FIG. 8 is a schematic view of the plane structure of another liquid-crystal cell.
Figure 9:
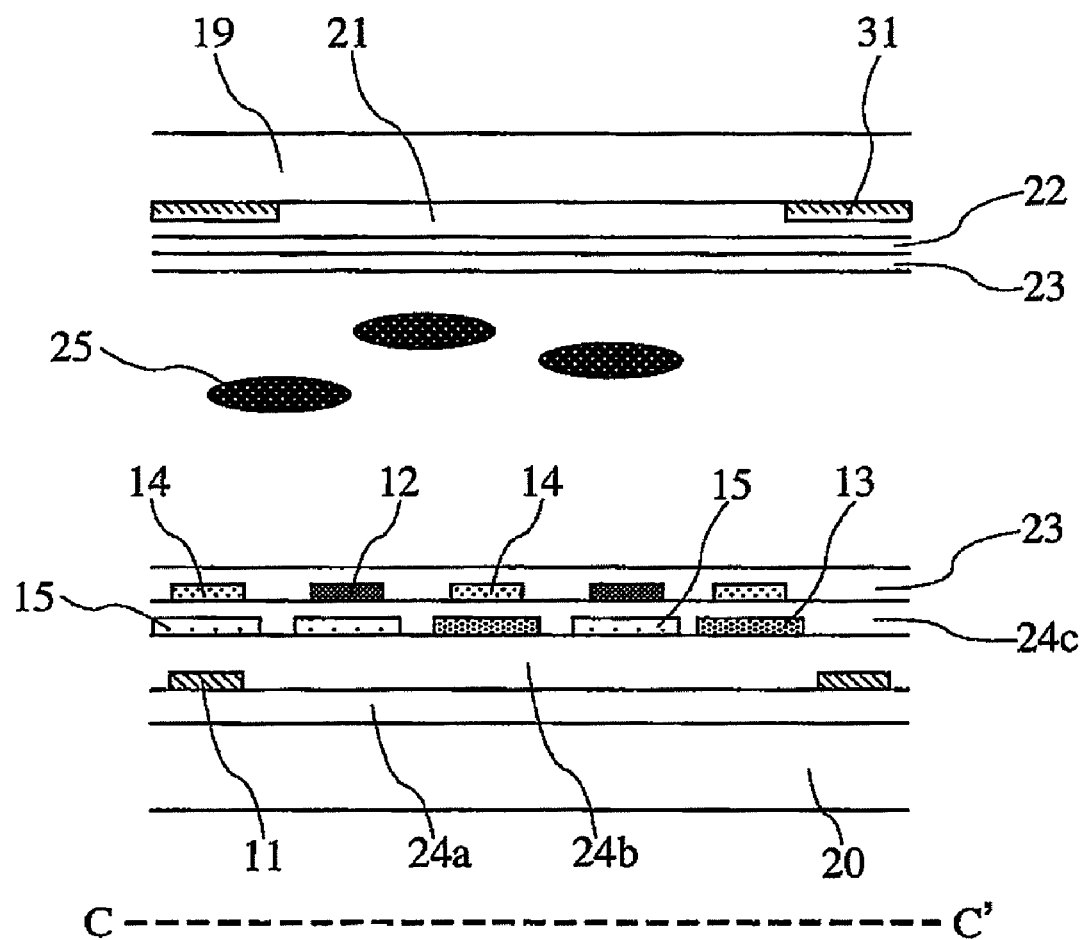
FIG. 9 is a cross-sectional schematic view of section C-C' shown in FIG. 8.

In FIG. 8, the direction of the interdigital electrodes is essentially parallel to the signal line 11, and the common electrodes 14 and 15 are connected to vertically adjacent pixels on the signal line 11. FIG. 9 is a cross-sectional schematic view of section C-C' in FIG. 8.

Figure 10:
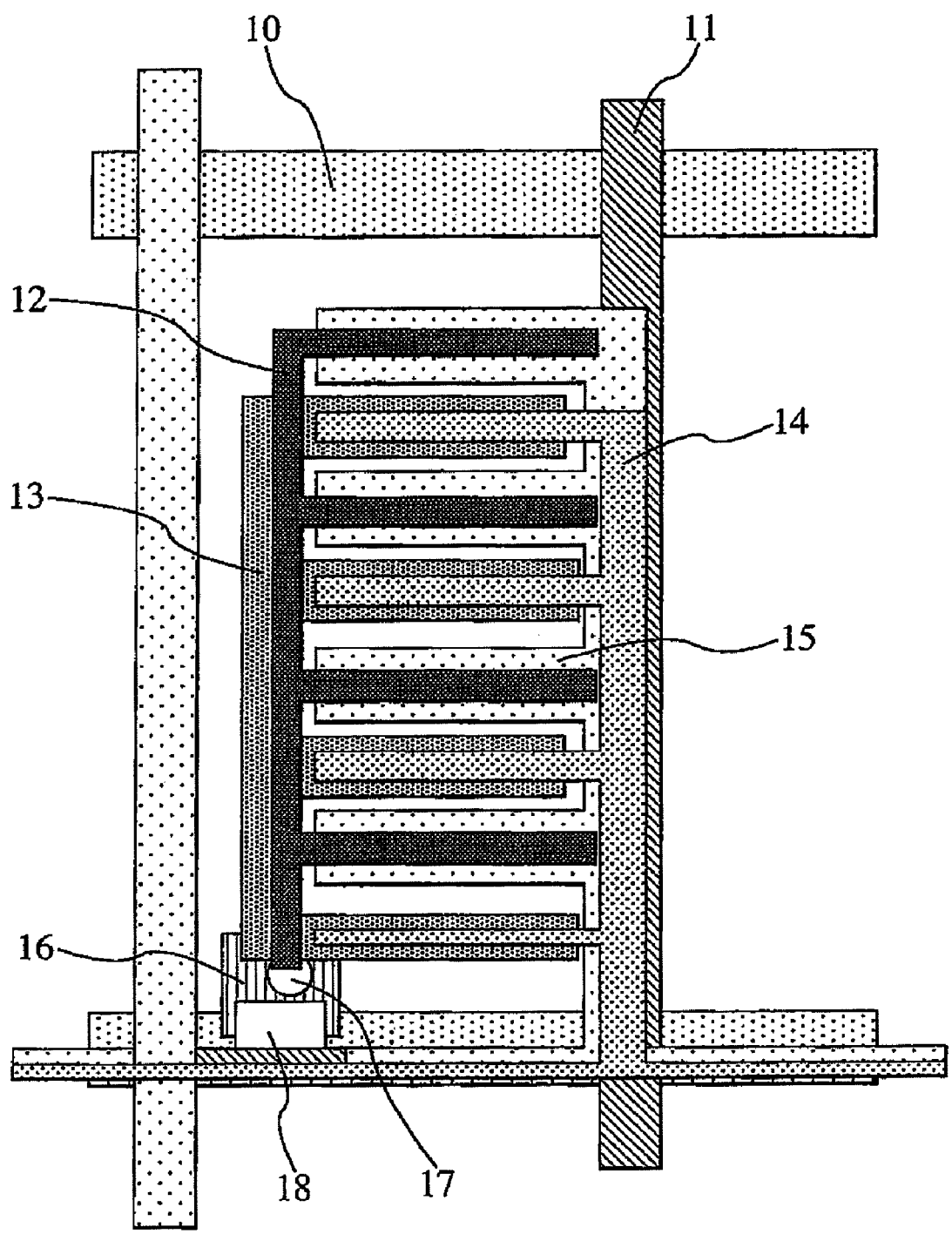
FIG. 10 is a schematic view of the plane structure of yet another liquid-crystal cell.
Figure 11:
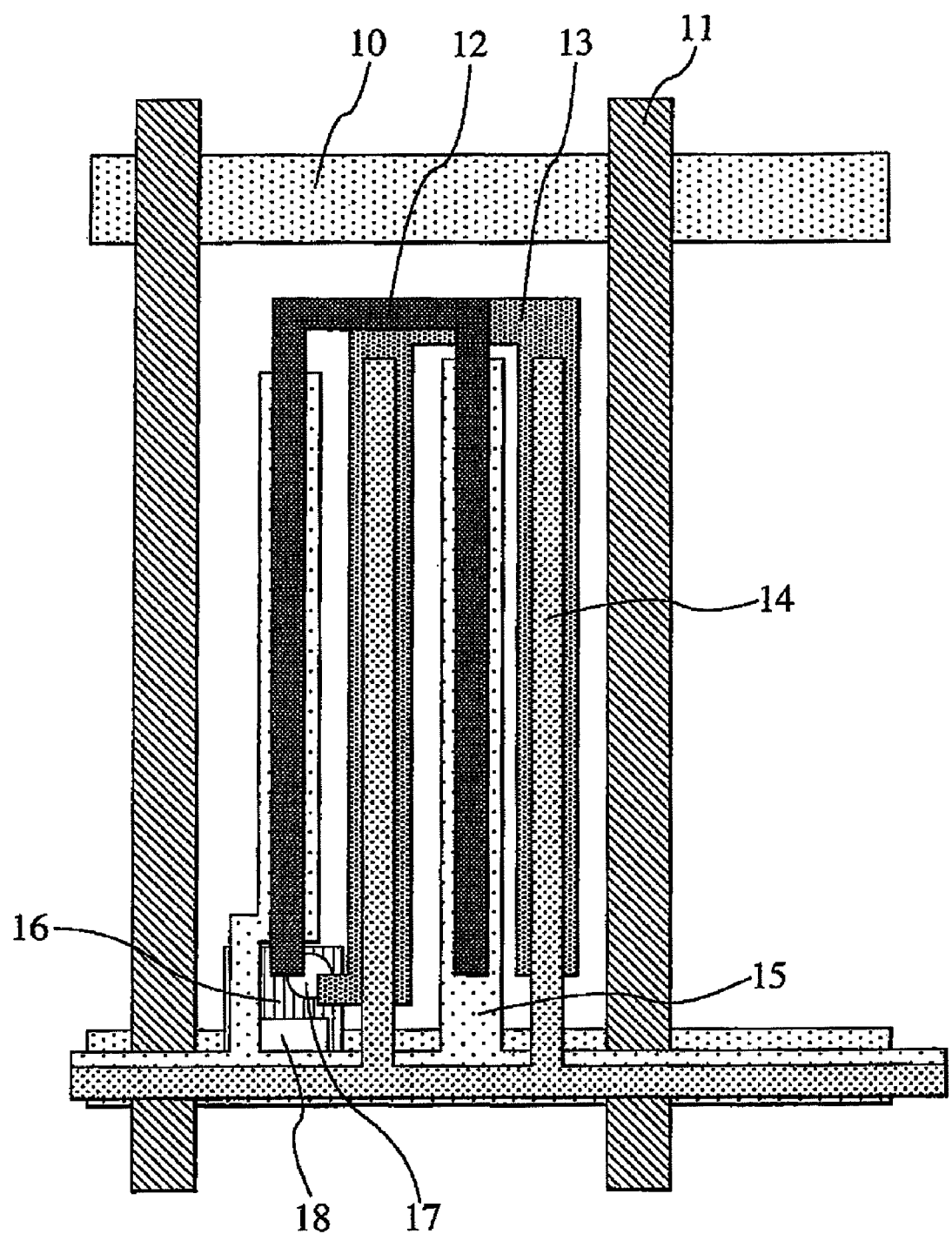
FIG. 11 is a schematic view of the plane structure of a further liquid-crystal cell.

In FIG. 10, the direction of the interdigital electrodes is essentially parallel to the scan line 10, and the common electrodes 14 and 15 are connected to horizontally adjacent pixels on the scan line 10. In FIG. 11, the direction of the interdigital electrodes is essentially parallel to the signal line 11, and the common electrodes 14 and 15 are connected to horizontally adjacent pixels on the scan line 10. Provided that the common electrodes are connected to adjacent pixels on the scan line 10 or the signal line 11, the present embodiment can take any other configuration.

By taking the above configuration, the present embodiment can provide a liquid-crystal display device high in transmittance and minimized in color shifting.

Second Embodiment

A second embodiment employs a liquid crystal aligned in multi-domain form to reduce color shifting. The multi-domain alignment here means aligning the liquid crystal in at least two directions by bending electrodes as described in Japanese Laid-Open Patent Application Publication JP-A-H11-30784, thereby to reduce color shifting that may occur when the display screen of a liquid-crystal display device of the IPS mode is observed from an oblique direction.

Figure 12:
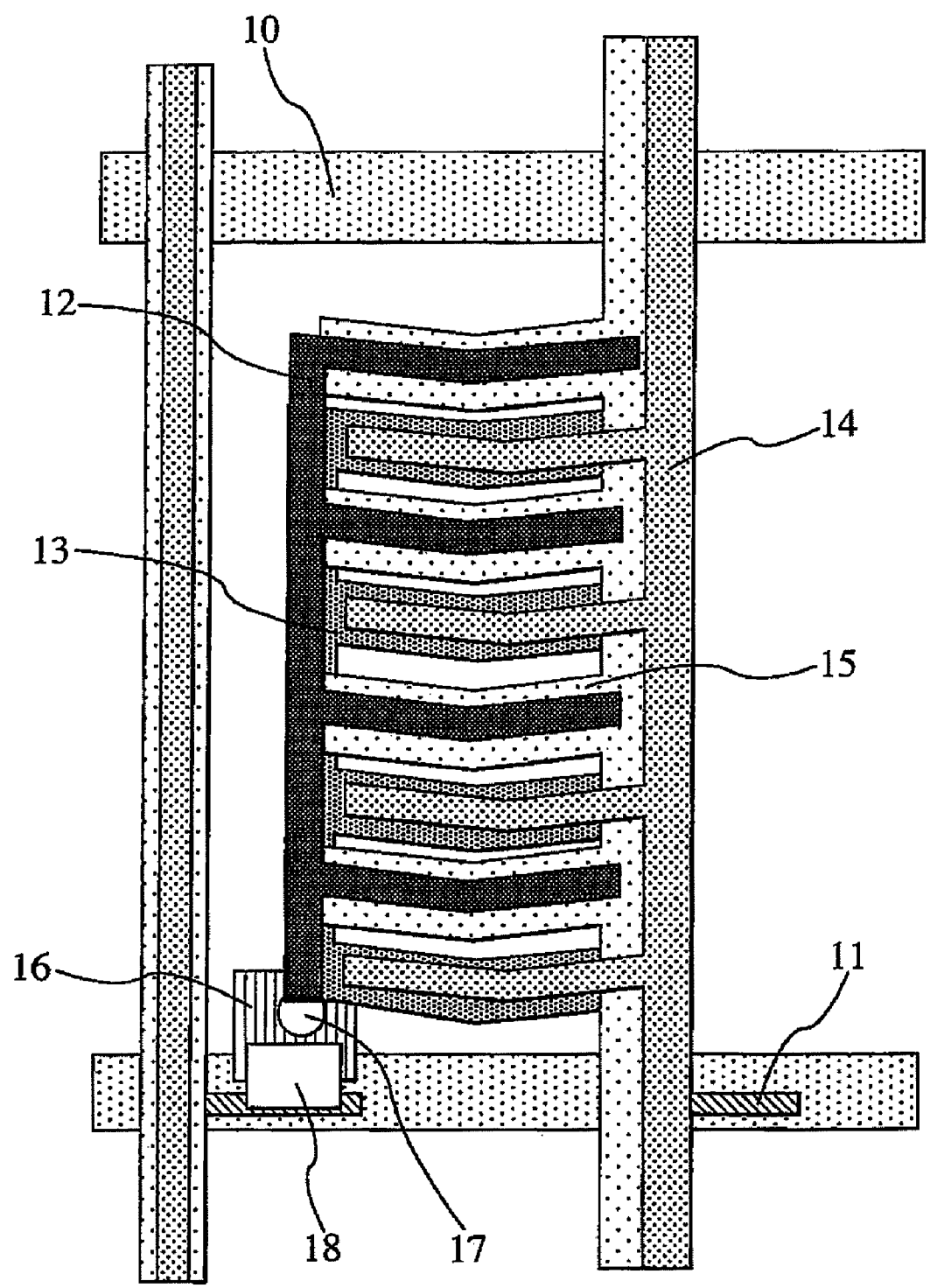
FIG. 12 is a schematic view of the plane structure of a liquid-crystal cell in a second embodiment.

The basic configuration of the present embodiment is essentially the same as that of the first embodiment. Only differences therefrom are described below using FIG. 12. To obtain the above multi-domain structure, interdigital electrodes need to be bent. Although the direction of the interdigital electrodes in FIG. 12 is essentially parallel to the scan line 10, this layout form does not limit the present embodiment. How often the electrodes are bent is not limited, either.

Achieving the multi-domain alignment in this way with the first pixel electrode 12 and the second common electrode 15 overlapped upon each other and with the first common electrode 14 and the second pixel electrode 13 overlapped upon each other makes it possible to provide a liquid-crystal display device high in transmittance and minimized in color shifting.

Third Embodiment

The basic configuration of a third embodiment is essentially the same as that of the first embodiment. Only differences therefrom will be described using FIGS. 13 and 14.

Figure 13:
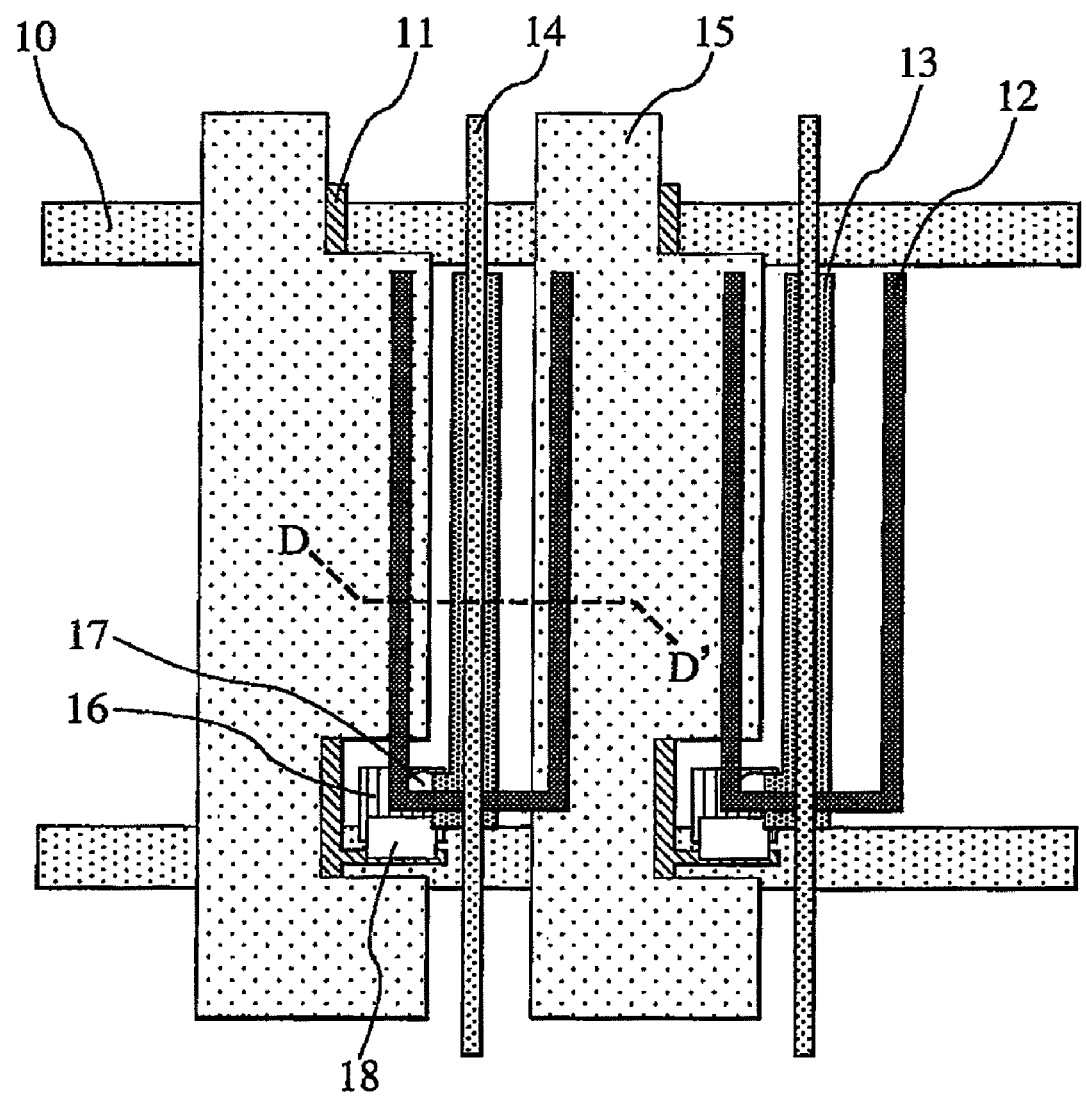
FIG. 13 is a schematic view of the plane structure of a liquid-crystal cell in a third embodiment.
Figure 14:
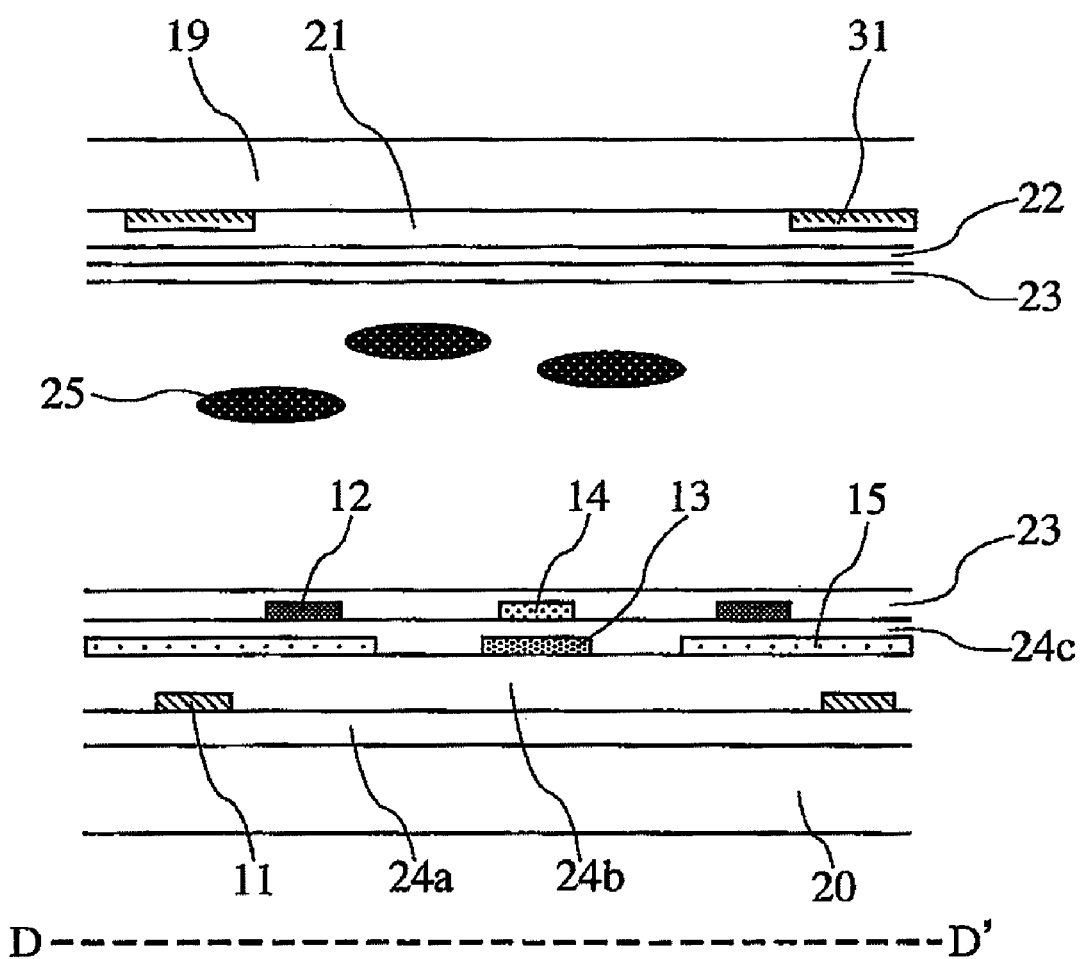
FIG. 14 is a cross-sectional schematic view of section D-D' shown in FIG. 13.

In the present embodiment, as shown in FIG. 13, the second common electrode 15 disposed below the first pixel electrode 12 which is disposed in closest proximity to the signal line 11 is shared by two adjacent pixels present at both sides of the signal line 11. In this case, the second common electrode 15 is also overlaid upon the signal line 11. FIG. 14 shows a cross-sectional schematic view of section D-D' in FIG. 13.

Disposing the second common electrode 15 in this way makes it possible for any impacts of field leakage from the signal line 11 to be removed almost completely and for a resistance value to be reduced since the common electrode 15 can be increased in area. This, in turn, renders luminance sloping less prone to occur in pixel regions, hence allowing the aperture ratio of the liquid-crystal display device to be correspondingly enhanced.

Fourth Embodiment

The basic configuration of a fourth embodiment is essentially the same as that of the first embodiment. Only differences therefrom will be described using FIGS. 15 and 16.

Figure 15:
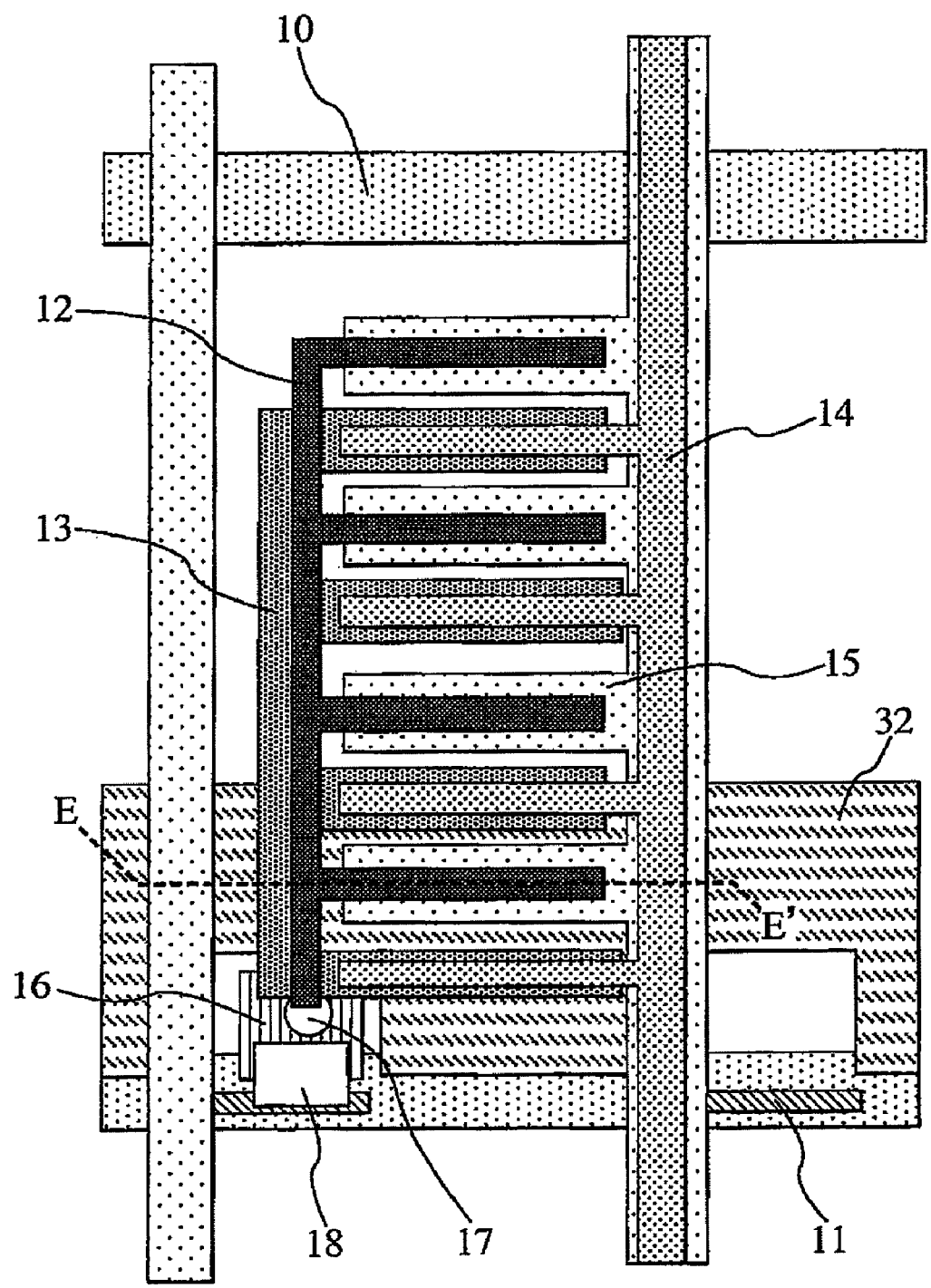
FIG. 15 is a schematic view of the plane structure of a liquid-crystal cell in a fourth embodiment.
Figure 16:
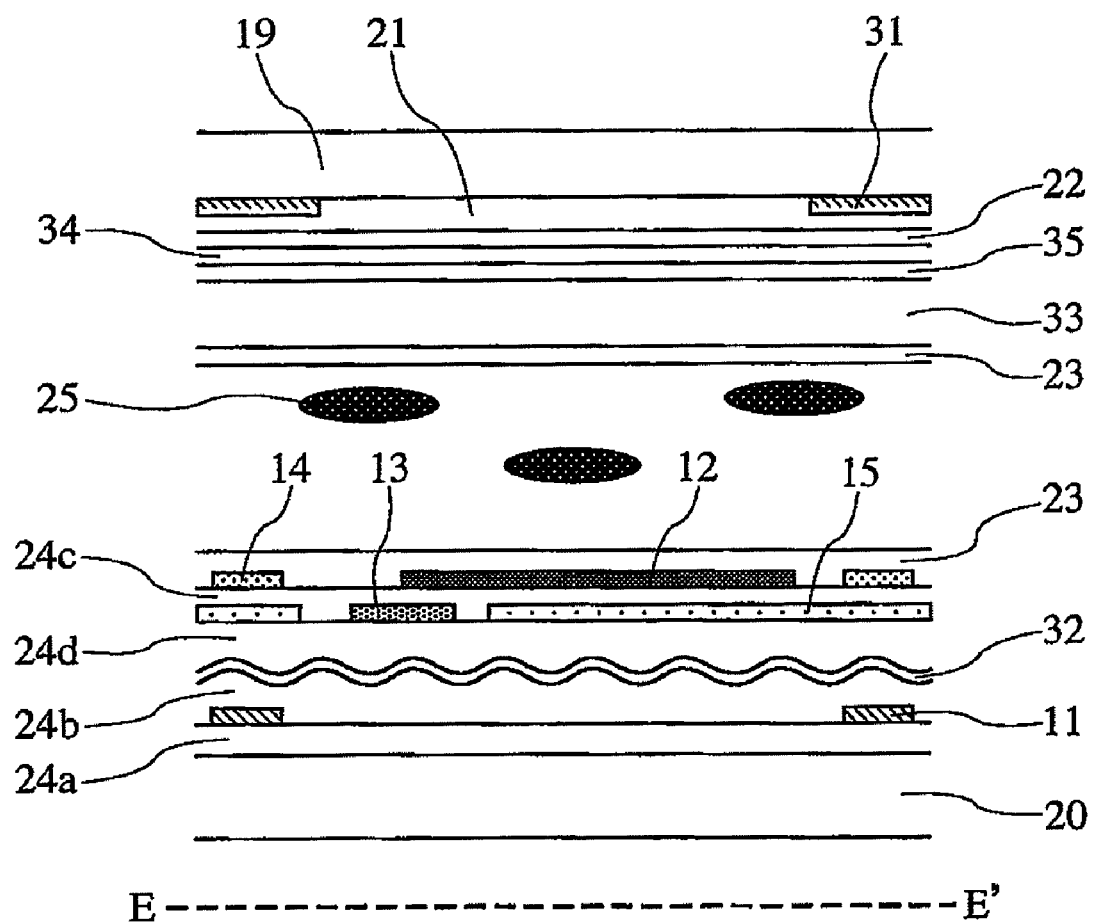
FIG. 16 is a cross-sectional schematic view of section E-E' shown in FIG. 15.

The present embodiment is a transflective liquid-crystal display device having a reflective display region in part of each pixel, as shown in FIG. 15. A cross-sectional schematic view of section E-E' in FIG. 15 is shown in FIG. 16. Differences from the first embodiment are that the display device includes a reflecting plate 32 and that the device further includes an insulating layer 24d for electrical insulation from other layers. A further difference is that as shown in FIG. 16, an in-cell retardation plate 34 and a passivation layer 35 are arranged on the surface of the leveling layer 22 of the first substrate 19 which surface faces the liquid-crystal layer 25.

The reflecting plate 32 is provided to reflect external light incident from the first-substrate-19 side. The reflecting plate 32 has surface irregularities to diffuse the incident external light. Although only the reflecting plate 32 can have the surface irregularities, the surface of the insulating 24d in the present embodiment is made rough, thereby to assign the surface irregularities to the reflecting plate 32, as shown in FIG. 16. The reflecting plate 32 is desirably silver, aluminum, or other materials exhibiting a high reflectance in a visible region.

The in-cell retardation plate 34 is disposed to bring optical characteristics of the reflective display region closer to those of the transmissive display region. Since the in-cell retardation plate 34 is formed from a liquid-crystal polymer, the retardation plate is excellent in molecular orientation, compared with a retardation plate fabricated by stretching an organic polymer film, and has essentially the same degree of orientation as that of the liquid-crystal layer 25. Because of this, Δn of the in-cell retardation plate 34 is much greater than that of an external retardation plate; adoption of an appropriately conditioned molecular structure and manufacturing parameters makes it possible to obtain a value of Δn equivalent to or surpassing that of the liquid-crystal layer 25. External retardation plates have layer thicknesses as large as tens of micrometers (μm), which is nearly 10 times as large as that of the liquid-crystal layer. Use of a liquid-crystal polymer, however, makes it possible to reduce the in-cell retardation plate 34 very significantly in layer thickness.

The in-cell retardation plate 34 is formed by rubbing a substrate on which an alignment film is formed, then dissolving a diacrylic liquid-crystal composition together with an optical reaction initiator in an organic solvent, and applying the organic solvent to the surface of that substrate using a method such as spin coating or printing. The solvent, although in a solution state immediately after being applied, can be orientated in the alignment direction of the retardation layer alignment film while evaporating the solvent. The surface under this state is irradiated with ultraviolet rays to polymerize the molecules with their acrylic groups bonded to each other. At this time, oxygen can be a cause of hindrance to polymerizing reactions, but if the concentration of the optical reaction initiator is high enough, optical reactions progress at sufficiently high rates. If the in-cell retardation plate 34 requires patterning at this stage, the in-cell retardation plate 34 can be disposed only at a necessary section by avoiding exposure of a desired patterning region to the light via a mask or the like and developing the particular patterning section with an organic solvent. In this way, the retardation layer is formed by solidifying the retardation plate while almost maintaining the aligned state in the liquid-crystal layer. Subsequently, the retardation layer is superheated in the processes of forming a passivation layer and forming an alignment film. A retardation value decreases because of placement in a high-temperature state, but if the temperature in the high-temperature state is constant, the in-situ retardation value is essentially proportional to length of time during which the retardation layer is placed in the high-temperature state. Therefore, this is desirably taken into account when an initial retardation value is assigned. The retardation value of the in-cell retardation plate 34 used in the present embodiment is desirably in the range from λ to λ/4.

The passivation layer 35 is disposed to protect the liquid-crystal layer 25 so that the in-cell retardation layer 34 does not seep out thereonto. For example, an acrylic resin as used for the leveling layer 22 is desirably used as the passivation layer 35. Also, a stepped section 33 is disposed only in the reflective display region.

Transmissive display that uses the light emitted from a backlight unit and reflective display that uses external light reflected by the reflecting plate 32 can be simultaneously achieved by disposing each element in the above way. As a result, it is possible to provide a liquid-crystal display device high in transmittance and minimized in color shifting.

Additionally, the size of the reflective display region can be changed according to particular needs. Furthermore, provided that a transflective liquid-crystal display device is achieved, the device can be of any driving scheme; while the present embodiment uses the scheme that employs an in-cell retardation plate, application of other schemes is also possible.

A transflective liquid-crystal display device capable of achieving both transmissive display and reflective display can be provided by adopting the configuration set forth above.

Fifth Embodiment

The basic configuration of a fifth embodiment is essentially the same as that of the fourth embodiment. Only differences therefrom will be described using FIGS. 17 and 18.

Figure 17:
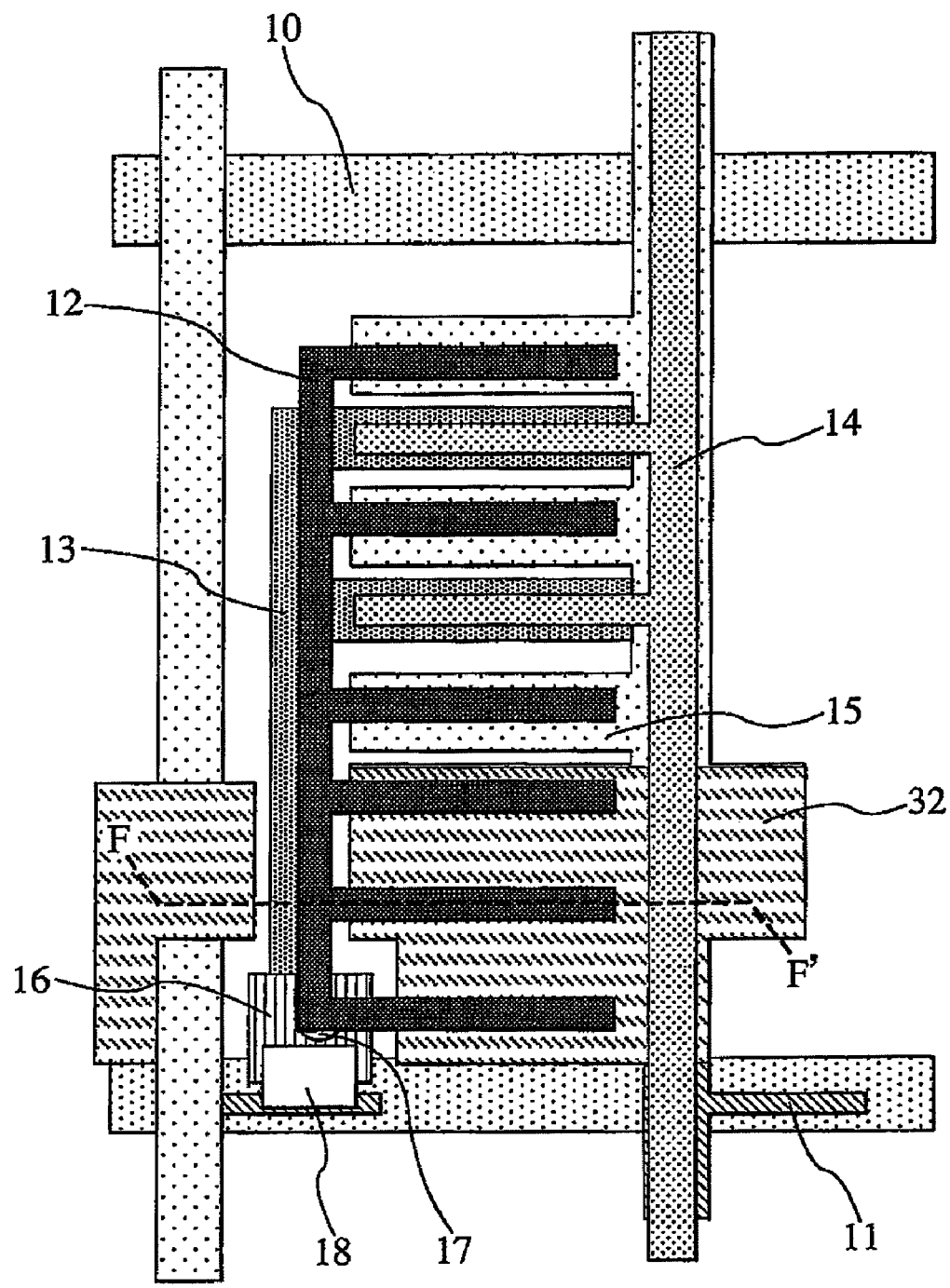
FIG. 17 is a schematic view of the plane structure of a liquid-crystal cell in a fifth embodiment.
Figure 18:
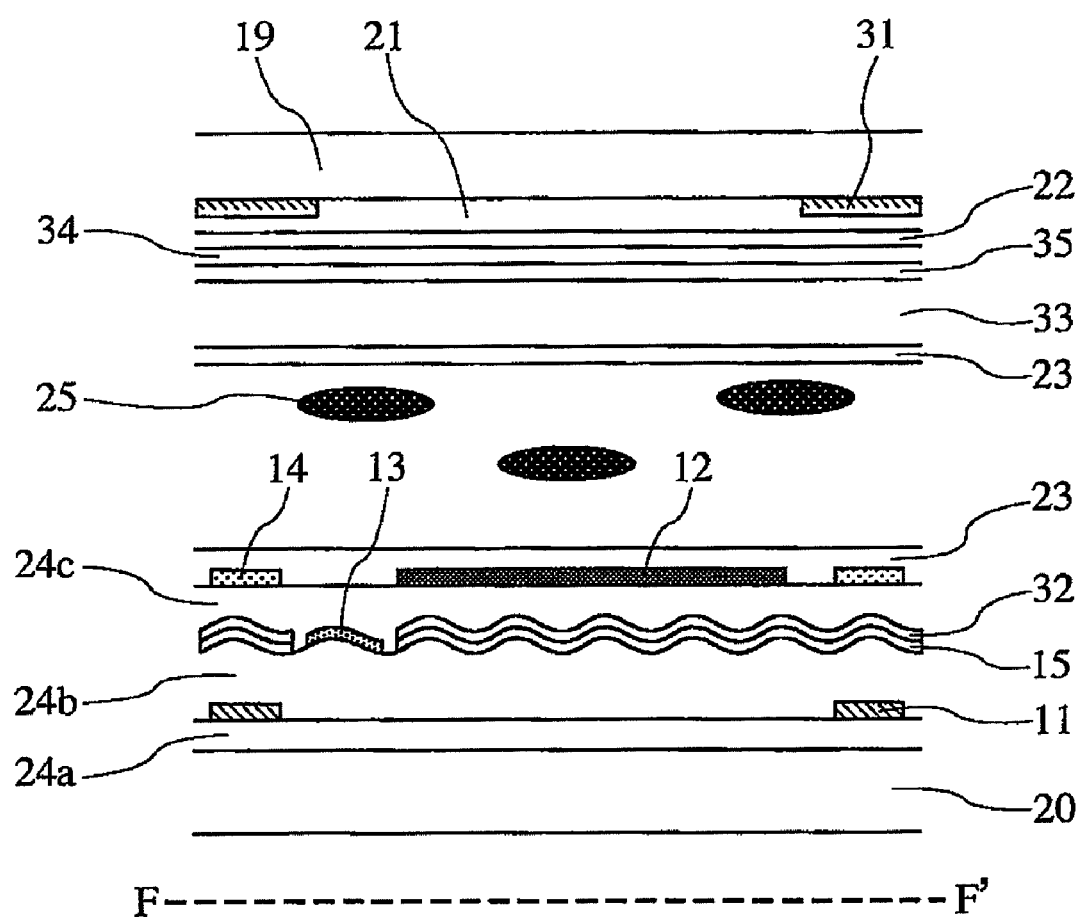
FIG. 18 is a cross-sectional schematic view of section F-F' shown in FIG. 17.

The present embodiment is also a transflective liquid-crystal display device having a reflective display region in part of each pixel, as shown in FIG. 17. A cross-sectional schematic view of section F-F' in FIG. 17 is shown in FIG. 18. In the fourth embodiment, the insulating layers 24b and 24d has been disposed at both sides of the reflecting plate 32 in order to obtain electrical dependence thereof. The present embodiment, however, has the reflecting plate 32 and second common electrode 15 stacked upon each other to combine respective functions of both.

The reflecting plate 32 is provided to reflect external light incident from the first-substrate-19 side. The reflecting plate 32 is disposed in a stacked condition upon the second common electrode 15. While the reflecting plate 32 is disposed on the liquid-crystal layer side in FIG. 18, the second common electrode 15 may instead be disposed on that side.

The first common electrode 14 and the second pixel electrode 13 are disposed only in the transmissive display region. Meanwhile, the first pixel electrode 12 is disposed in the reflective display region and the transmissive display region, and pitch of interdigital electrode width can vary between the transmissive display region and the reflective display region.

Adopting the above configuration makes it possible to reduce the number of insulating layers by one, compared with that of the fourth embodiment, and thus to provide a correspondingly low-cost transflective liquid-crystal display device.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid-crystal display device comprising:
a first substrate;
a second substrate;
a liquid-crystal layer sandwiched between the first substrate and the second substrate; and
a plurality of pixels each surrounded by scan lines and signal lines arranged in a matrix format on the second substrate;
wherein:
a first pixel electrode, a second pixel electrode, a first common electrode, and a second common electrode are arranged in the pixel region of the second substrate above which the liquid-crystal layer is disposed;
the first pixel electrode and the first common electrode are arranged on a first layer;
the second pixel electrode and the second common electrode are arranged on a second layer;
the first pixel electrode and the second common electrode are overlapped upon each other in the pixel region; and
the second pixel electrode and the first common electrode are overlapped upon each other in the pixel region.

2. The liquid-crystal display device according to claim 1, wherein:
the first pixel electrode, the first common electrode, the second pixel electrode, and the second common electrode are each of an interdigital electrode structure in the pixel region.

3. The liquid-crystal display device according to claim 2, wherein:
the interdigital portions of the first pixel electrode are disposed between those of the first common electrode; and
the interdigital portions of the second pixel electrode are disposed between those of the second common electrode.

4. The liquid-crystal display device according to claim 2, wherein:
when width of the first pixel electrode is taken as w1, and width of the second common electrode, as w2, a relationship of $w2/2 < w1 \leqq w2$ is established in the pixel region; and
when width of the first common electrode is taken as w1', and width of the second pixel electrode, as w2', a relationship of $w2'/2 < w1' \leqq w2'$ is established in the pixel region.

5. The liquid-crystal display device according to claim 4, wherein:
the first common electrode and the second pixel electrode are overlapped upon each other with an insulating layer interposed therebetween; and
the first pixel electrode and the second common electrode are overlapped upon each other with another insulating layer interposed therebetween.

6. The liquid-crystal display device according to claim 4, wherein, when each electrode disposed in the pixel region is observed in terms of positional relationships among the interdigital portions of the electrodes from the liquid-crystal layer side:
the interdigital portion of the first common electrode is disposed at an essentially central section of that of the second pixel electrode; and
the interdigital portion of the first pixel electrode is disposed at an essentially central section of that of the second common electrode.

7. The liquid-crystal display device according to claim 2, wherein:
the first common electrode is connected to the signal line in a direction parallel or perpendicular thereto or in both parallel and perpendicular directions thereto.

8. The liquid-crystal display device according to claim 2, wherein:
the second common electrode is connected to the signal line in a direction parallel or perpendicular thereto or in both parallel and perpendicular directions thereto.

9. The liquid-crystal display device according to claim 7 or 8, wherein:
the first common electrode and the second common electrode pass through the signal line or the scan line or both while overlapping each other partially.

10. The liquid-crystal display device according to claim 9, wherein:
the first common electrode and the second common electrode are overlaid upon all the signal lines arranged between the pixels.

11. The liquid-crystal display device according to claim 9, wherein:
the first common electrode and the second common electrode are overlaid upon all the scan lines arranged between the pixels.

12. The liquid-crystal display device according to claim 1, further comprising:
at least one contact hole in the pixel region; wherein the contact hole simultaneously connects the first pixel electrode and the second pixel electrode to the source electrode of a thin-film transistor.

13. A liquid-crystal display device comprising:
a first substrate;
a second substrate;
a liquid-crystal layer sandwiched between the first substrate and the second substrate; and a plurality of pixels each surrounded by scan lines and signal lines arranged in a matrix format on the second substrate;

wherein:

a first pixel electrode, a second pixel electrode, a first common electrode, and a second common electrode are arranged in the pixel region of the second substrate above which the liquid-crystal layer is disposed;

the first pixel electrode and the first common electrode are arranged on a first layer;

the second pixel electrode and the second common electrode are arranged on a second layer;

the first pixel electrode and the second common electrode are overlapped upon each other in the pixel region;

the second pixel electrode and the first common electrode are overlapped upon each other in the pixel region; and the region of the pixel includes a transmissive display region and a reflective display region.

14. The liquid-crystal display device according to claim 13, further comprising:

a reflecting plate on part of the second substrate; and an insulating layer between the reflecting plate, the second pixel electrode, and the second common electrode.

15. The liquid-crystal display device according to claim 13, wherein:

a reflecting plate is disposed on part of the second substrate;

the reflecting plate and the second common electrode are disposed in a stacked condition upon each other; and the second pixel electrode is disposed only in the transmissive display region.

* * * * *